Figure 1:
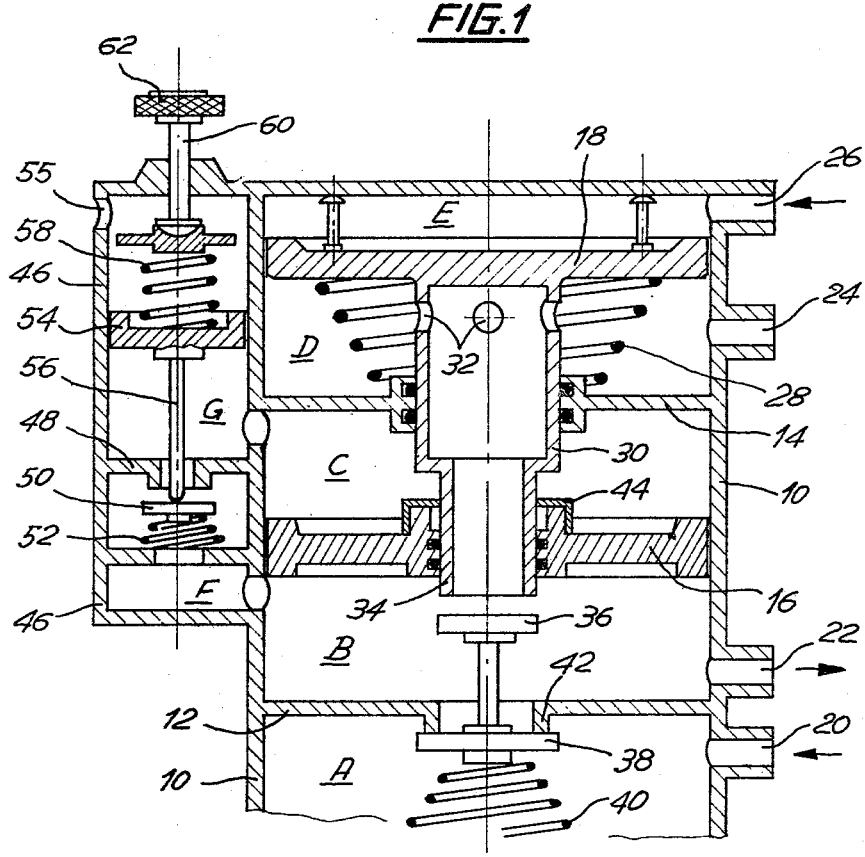

United States Patent [19]

Bordoni

[11] 4,264,108
[45] Apr. 28, 1981

[54] PROCESS AND RELATED DEVICE FOR PNEUMATIC PREDOMINANCE BRAKING IN GENERAL TOWED VEHICLES

[75] Inventor: Tonino Bordoni, Sesto S. Giovanni, Italy

[73] Assignee: Fabbrica Italiana Magneti Marelli, S.p.A., Milan, Italy

[21] Appl. No.: 955,524

[22] Filed: Oct. 30, 1978

[30] Foreign Application Priority Data

Oct. 28, 1977 [IT] Italy .................... 29109 A/77

[51] Int. Cl.³ ............................................. B60T 15/02
[52] U.S. Cl. .................... 303/6 C; 303/22 R; 303/40
[58] Field of Search ........... 303/7, 9, 28, 6 C, 22 R, 303/40

[56] References Cited

U.S. PATENT DOCUMENTS

| 3,936,097 | 2/1976 | Yanagawa | 303/6 C |
| 3,944,294 | 3/1976 | Masuda | 303/22 R |

*Primary Examiner*—Trygve M. Blix
*Assistant Examiner*—Reinhard J. Eisenzopf
*Attorney, Agent, or Firm*—Ostrolenk, Faber, Gerb & Soffen

[57] ABSTRACT

The invention concerns a pneumatic braking system, principally for a towed vehicle, for controlling the timing or sequence of operation of a pneumatic brake. A piston in a cylinder has one face exposed to a towed vehicle air supply and its opposite face exposed to an adjustable pneumatic pressure, a throttling member of a pressure reducer connects both sides of the piston and the chambers on both sides of the throttling member are respectively connected to respective ones of the chambers of the cylinder on both sides of the piston.

10 Claims, 2 Drawing Figures

PROCESS AND RELATED DEVICE FOR PNEUMATIC PREDOMINANCE BRAKING IN GENERAL TOWED VEHICLES

This invention relates to a process and to a related device for pneumatic braking with predominance features in general towed vehicles.

It is the object of the present invention to provide for braking of towed vehicles having features of predominance or advance relative to the tractor braking and providing the possibility of readily adjusting such a braking. Particularly, it is the object of the invention to provide pneumatic devices, particularly relay emergency valves and relay valves for suitably controlling a trailer braking or effecting the braking of the trailer.

Relay valves and relay emergency valves are known as fitted with devices for providing the braking predominance with or without the capability of adjusting said predominance. Such known devices would use either a spring (as suitably preloaded against the movement of the reaction piston), or a check valve having its moving element acted upon by a spring, of which the preload is adjustable, and which is placed upstream the chamber wherein the reaction piston is slidable.

However, in both of said cases, problems of not easy and simple solution have to be satisfied. In the first case, for example, the preload of the predominance spring should be readily adjusted by acting upon the reaction piston, while in the second case the compressed air should be released or exhausted downstream the check valve during the exhaust stroke.

The invention overcomes these and other disadvantages and enables to provide the trailer braking with a determined and desired predominance that can be readily adjusted.

The process according to the invention, in which a reaction piston-cylinder assembly, responsive to the air pressure relative to the trailer air supply and the moving element of which is effective on air shut off members for the trailer brakes to vary and control the operation and/or intensity or strength of braking being exerted on said trailer, is characterized by applying a suitably adjusted pneumatic pressure on one of the faces of the piston in said reaction piston-cylinder assembly, while the pressure of the trailer air supply is applied on the other face of said piston, thereby to operate the brakes of said trailer according to a predetermined sequence with respect to the tractor brakes.

A device accomplishing the above described process, including a reaction piston-cylinder assembly, the piston of which is responsive to the air pressure of the trailer braking system and is operatively connected both to the moving element of a second piston-cylinder assembly, in the case by a switchable shut off member connecting the operating means for the trailer brakes either with the trailer air tank or with exhaust, is characterized by pneumatic throttling members for varying in time the air pressure from the trailer tank, and means for applying such a time varied pressure to the face of said reaction piston opposite to that having the trailer tank air pressure applied thereto, so that different pressures are applied to the faces of said reaction piston, thus effecting the tractor predominance braking.

Advantageously, the pneumatic throttling members comprise a pressure reducer, the pneumatic chambers of which are connected with the chambers of the reaction piston-cylinder assembly and such chambers are pneumatically interconnected through the throttling member by such a pressure reducer, the moving element of which is on one hand affected by the action of spring means, and on the other hand by the pneumatic pressure supplying the trailer braking members.

In an advantageous embodiment of the device, the pressure reducer is provided with adjustable members to vary thereby the pressure differential and according the time or period of its operation on the piston of said reaction piston-cylinder assembly.

The invention will now be disclosed by the following description referring to the accompanying drawing showing by way of example a preferred embodiment of the device incorporated in a relay valve and accomplishing the process according to the invention.

Figure 2:
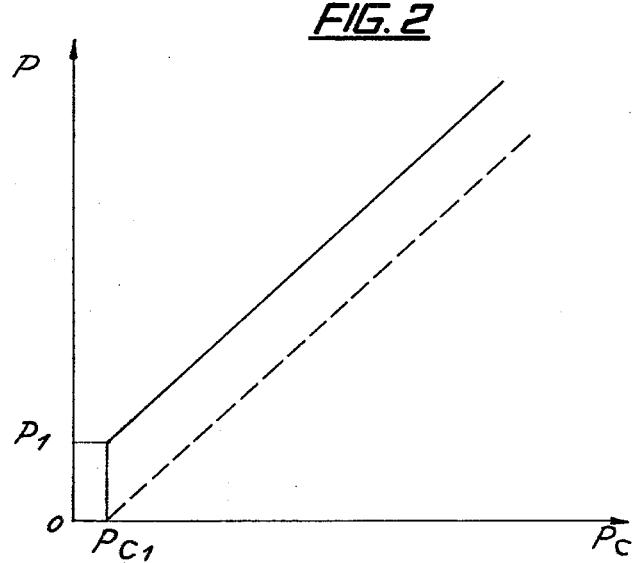

Particularly, in the drawing:

FIG. 1 is a schematic fragmentary longitudinal sectional view of the relay valve embodying the device according to the invention; and FIG. 2 is a diagram showing by way of comparison the pattern for the characteristics between the output pressure as a function of the control pressure in a prior art relay valve (dashed line) and in the relay valve of FIG. 1 (full line).

As above mentioned, the present invention may in practice be differently embodied, in that the device accomplishing the process according to the invention may be incorporated in or combined with any apparatus for controlling the braking operation in a towed vehicle.

For example, such a device could be incorporated in a relay emergency valve or in a relay valve, as shown in the drawing.

The relay valve of FIG. 1 includes a housing 10, the inside of which is divided by diaphragms 12 and 14 and pistons 16 and 18 into a plurality of pneumatic chambers A, B, C, D and E. As it will be discussed in the following, piston 16 is freely slidable within chambers B and C and constitutes a reaction piston. By means of ports 20 and 22, respectively, chambers A and B are connected with a compressed air tank carried on the trailer and has pneumatic members operating the trailer brakes either directly (and this in the case of relay emergency valves) or indirectly through the relay valve shown.

By means of ports 24 and 26, respectively, chambers D and E are connected with the atmosphere and with the control tubing terminating in the distributor carried on the tractor.

Spring means 28 act upon piston 18 and operate against the action of pressure air which is time by time present in chamber E. Said piston 18 firmly retains a tube or sleeve 30, the interior of which is communicated with chamber D by radial holes 32 and terminates at the bottom with a push rod or ferrule 34. The end of the latter sealingly cooperates with one of elements 36 of a valve 36, 38 affected by spring means 40, the action of which holds the other element 38 of said double valve in engagement against the sealing seat 42 provided by diaphragm 12, thereby to control the communication between chambers A and B.

Said push rod or ferrule 34 also forms a guide member for reaction piston 16, the latter including at its central zone a crown 44 operatively engaging a shoulder provided between said sleeve 30 and push rod or ferrule 34, thereby to move piston 18.

Chambers B and C, as defined at the top and bottom by reaction piston 16, are pneumatically connected with chambers F and G defined in a complementary housing 46 by a diaphragm 48. This complementary housing 46 is located laterally of housing 10 and its diaphragm 48 centrally has an aperture, of which the edge forms a sealing seat for a throttling member 50 pressed against said seat by respective spring means 52.

At the top said housing 46 slidably retains a sealing member or piston 54, provided with a stem 56 for cooperation with said throttling member 50. A spring 58 acts upon piston 54 and at its other end is retained by an adjusting screw 60 provided with an operating collar 62, thereby to vary and adjust the action of said spring against the pressure being time by time established in chamber G, as it will be now explained. The action exerted by spring 58 is of a larger extent than that exerted by spring 52 on throttling member 50. Briefly, the member just described constitutes a pressure reducer and the pressures thereby controlled exert the action thereof on the opposing faces of reaction piston 16 in connection with the device operation and accordingly with the accomplishement of the process according to the invention.

The features of the process according to the invention will now be disclosed with reference also to the diagram of FIG. 2.

On considering the relay valve shown in the drawing and assume that such a relay valve is at rest or inoperative condition, chamber E is connected with exhaust in connection with the position taken by the distributor of the braking system.

Piston 18 together with push rod or ferrule 34 is upward urged by the action of spring 28 and, as a result, valve 38 closes the communication between chambers A and B, while this last mentioned chamber is connected through push rod or ferrule 34 and port 24 with exhaust. Therefore, the trailer braking members connected with port 22 are not operated.

Further, under these conditions, throttling member 50 is open, thereby establishing the communication between chambers F and G as, above mentioned, the preload given to spring 58 by adjusting member 60 is larger than the preload of return spring 52 acting upon said throttling member 50.

Under these conditions, it results that chamber C through chambers G and F, communicates with the atmosphere since, as above mentioned, chamber B is connected with exhaust or outlet 24.

When the operator operates the distributor of the braking system, pressure air is supplied into chamber E and piston 18 is downward moved against the action of spring 28 and operates said double valve 36, 38 to open. Particularly, push rod or ferrule 34 first engages valve 36, shutting off the communication between chamber B and exhaust or outlet (port 24). Then and on continued movement of piston 18, said push rod or ferrule 34 opens valve 38, whereby chamber A is connected with chamber B. Thus, the pressure air of the trailer tank passes from said chamber A to chamber B. The pressure air in chamber B passes to the operating members for the trailer brakes, but which are not operated since the pressure of air only is not sufficient, and this in connection with the drops in pressure and limited opening defined between valve 38 and associated seat 42.

Further, air in chamber B passes to chamber F and through open throttling member 50 to chamber G and therefrom to chamber C. As a result, two equal and opposing pressures will be applied on the faces of reaction piston 16. Therefore, such a piston 16 does not cause any reaction thrust against the springy piston 18, while pressure P (see FIG. 2) will rapidly increase independently of the control pressure PC.

Opening of valve 38 allows the passage of air from chamber A to chamber G. When the pressure in chamber G reaches the calibration value determined by the adjusting member 60, 62, the pressure in chamber G acting on piston 54 becomes prevailing with respect to the load exerted by spring 58, so that valve 50 is closed shutting off the communication between chambers B and C, thereby. One valve 50 is closed, pressure in chamber C remains constant, but that in chamber B continues to increase. Until this point, piston 16 is stationary and does not transmit force to piston 18.

The increasing pressure in chamber B causes upward thrust of reaction piston 16 which is transmitted from crown 44 to spring piston 18 in opposite direction to the control thrust due to the pressure in chamber E. To move piston 18, the increasing response pressure PC in chamber B causes a corresponding increase in the control pressure P chamber E. Thus, piston 18 is retained at balanced state under the action of control pressure PC and outlet pressure P, while said pressure increases proportionally to control pressure PC, as shown clearly by the full line curve of the diagram of FIG. 2. This means that the braking pressure of the trailer increases just as the braking pressure of the tractor does.

In such a diagram, reference PC1 designates the outlet starting pressure and P1 the value of the predominance pressure.

Thus, the trailer braking can be suitably advanced relative to the tractor braking and such an advance or predominance is determined by the degree of pressure which is determined time by time in chamber C of reaction piston-cylinder assembly 10–16.

It should be understood that in practice the device could contemplate modifications and changes, particularly in connection with the means for suitably building up in chambers B, C of the reaction assembly 10-16 the time varying pressure differentials, and this particularly in connection with the utilization features of said device. Thus, it is within the scope of the invention and accordingly within the covering field of the invention patent.

What is claimed is:

1. Apparatus for establishing predominance of braking in a pneumatic braking system, comprising:

a main cylinder; main piston means in said main cylinder and shiftable axially of said main cylinder; at one side of said main piston means, said main cylinder being connected to a first braking system pressure supply; at the other side of said main piston means, said main cylinder including a first chamber connected to a second braking system pressure supply;

pneumatic throttling means communicating with said first chamber; said pneumatic throttling means including a second chamber connected with said first chamber for being pressurized along with said first chamber, said second chamber being so connected with said main piston means as to prevent shifting of said main piston means due to increase in pressure in said first chamber; said pneumatic throttling means including a valve communicating with said second chamber for being closed by the pressure in said first and second chambers, when the pressure in said first and said second chambers exceeds a first level; said valve being so positioned that when said valve is closed, it blocks communication between said first and said second chamber; an increase in pressure in said first chamber thereafter acts to shift said main piston means to increase the pressure in said main cylinder at said one side of said main piston means.

2. The apparatus of claim 1, wherein said valve comprises a valve element which has one side in communication with said second chamber and which also communicates with spring means which normally bias said valve to open the communication between said first and said second chambers.

3. The apparatus of claim 2, further comprising means for adjusting the biasing force of said biasing means upon said valve.

4. The apparatus of claim 2, wherein said main piston means comprises a first piston, which includes said one side of said main piston means; said main piston means further comprises a second piston axially shiftable in said cylinder with respect to said first piston, and said first and second pistons being normally spaced apart; said first chamber communicating with said second piston for causing pressure in said first chamber to move said second piston toward engagement with said first piston, and following engagement between said first and said second piston, further movement of said second piston also moving said first piston to increase pressure in said main cylinder at said main piston means one side.

5. The apparatus of claim 4, wherein said second chamber communicates with said second piston to oppose movement of said second piston toward said first piston.

6. The apparatus of claim 3, further comprising biasing means for normally urging said first piston to increase the pressure in said main cylinder at said one side of said main piston means.

7. The apparatus of claim 5, further comprising a conduit between said first chamber and an exhaust from said main cylinder; said first piston and said conduit being so shaped and so positioned that upon said first piston shifting due to an increase in pressure at said main cylinder one end, said conduit is shut.

8. The apparatus of claim 7, wherein said first piston includes a ferrule on which said second piston is guided, and said ferrule including a shoulder for being engaged by said second piston as said second piston shifts toward said first piston.

9. The apparatus of claim 8, wherein said ferrule defines said conduit through it.

10. The apparatus of claim 7, wherein said second chamber includes at least a portion thereof located in said main cylinder between said first and said second pistons.

* * * * *